(12) United States Patent  
Landry et al.

(10) Patent No.: US 9,883,783 B2
(45) Date of Patent: Feb. 6, 2018

(54) DEBRIS SENSOR FOR CLEANING APPARATUS

(71) Applicant: iRobot Corporation, Bedford, MA (US)

(72) Inventors: Gregg W. Landry, Gloucester, MA (US); David A. Cohen, Brookline, MA (US); Daniel N. Ozick, Newton, MA (US)

(73) Assignee: iRobot Corporation, Bedford, MA (US)

( * ) Notice: Subject to any disclaimer, the term of this patent is extended or adjusted under 35 U.S.C. 154(b) by 0 days.

(21) Appl. No.: 15/419,425

(22) Filed: Jan. 30, 2017

(65) Prior Publication Data

US 2017/0202419 A1  Jul. 20, 2017

Related U.S. Application Data

(63) Continuation of application No. 14/824,940, filed on Aug. 12, 2015, now Pat. No. 9,591,959, which is a (Continued)

(51) Int. Cl.
B64C 13/18 (2006.01)
G05D 1/00 (2006.01)
(Continued)

(52) U.S. Cl.
CPC ............... A47L 9/281 (2013.01); A47L 5/362 (2013.01); A47L 9/0466 (2013.01);
(Continued)

(58) Field of Classification Search
CPC .... A47L 9/2857; A47L 9/2842; A47L 9/2894; A47L 9/2852; A47L 9/2889;
(Continued)

(56) References Cited

U.S. PATENT DOCUMENTS 3,674,316 A * 7/1972 De Brey ............... A47L 9/2857
15/339
3,989,311 A * 11/1976 Debrey ..................... A47L 9/19
111/903

(Continued)

FOREIGN PATENT DOCUMENTS

JP  53-110257  9/1978
JP  62-151851  9/1978

(Continued)

OTHER PUBLICATIONS

"Facts on the Trilobite," Electrolux, accessed online <http://trilobite.electrolux.se/presskit_en/node1335.asp?print=yes&pressID=> Dec. 12, 2003, 2 pages.

(Continued)

Primary Examiner — Paul Ip
(74) Attorney, Agent, or Firm — Fish & Richardson P.C.

(57) ABSTRACT

A piezoelectric debris sensor and associated signal processor responsive to debris strikes enable an autonomous or non-autonomous cleaning device to detect the presence of debris and in response, to select a behavioral mode, operational condition or pattern of movement, such as spot coverage or the like. Multiple sensor channels (e.g., left and right) can be used to enable the detection or generation of differential left/right debris signals and thereby enable an autonomous device to steer in the direction of debris.

19 Claims, 10 Drawing Sheets

DETECT LEFT AND RIGHT DEBRIS SIGNALS REPRESENTATIVE OF INSTANTANEOUS DEBRIS STRIKES/PRESENCE/QUANTITY/VOLUME/ DIRECTION OF/VECTOR TO DEBRIS OR DEBRIS FIELD, 802

→ SELECT OPERATIONAL MODE OR PATTERN OF MOVEMENT (e.g., SPOT MODE) BASED ON DEBRIS SIGNAL VALUES, 804

→ SELECT DIRECTION OF MOVEMENT BASED ON DIFFERENTIAL (LEFT/RIGHT) SIGNAL VALUES (e.g., STEERING TOWARD SIDE WITH MORE DEBRIS), 806

→ GENERATE USER PERCEPTIBLE SIGNAL (e.g., ILLUMINATE AN LED OR LIGHT), 808

→ VARY OR CONTROL OPERATIONAL CONDITION (POWER/OTHER), 810

→ CALCULATE DEBRIS GRADIENT AND CONTROL MOVEMENT, 812

Related U.S. Application Data continuation of application No. 13/893,038, filed on May 13, 2013, now Pat. No. 9,144,361, which is a continuation of application No. 13/523,109, filed on Jun. 14, 2012, now Pat. No. 8,598,829, which is a continuation of application No. 12/255,393, filed on Oct. 21, 2008, now Pat. No. 8,378,613, which is a continuation of application No. 11/860,272, filed on Sep. 24, 2007, now Pat. No. 7,459,871, which is a continuation of application No. 11/533,294, filed on Sep. 19, 2006, now Pat. No. 7,288,912, which is a continuation of application No. 11/109,832, filed on Apr. 19, 2005, now abandoned, which is a continuation of application No. 10/766,303, filed on Jan. 28, 2004, now Pat. No. 6,956,348.

(51) Int. Cl.
   *A47L 9/28* (2006.01)
   *A47L 9/04* (2006.01)
   *A47L 11/40* (2006.01)
   *G05D 1/02* (2006.01)
   *A47L 5/36* (2006.01)

(52) U.S. Cl.
   CPC .......... *A47L 9/0488* (2013.01); *A47L 9/2831* (2013.01); *A47L 9/2842* (2013.01); *A47L 9/2852* (2013.01); *A47L 9/2857* (2013.01); *A47L 9/2884* (2013.01); *A47L 9/2889* (2013.01); *A47L 9/2894* (2013.01); *A47L 11/4005* (2013.01); *A47L 11/4008* (2013.01); *A47L 11/4011* (2013.01); *A47L 11/4061* (2013.01); *A47L 11/4066* (2013.01); *G05D 1/0227* (2013.01); *G05D 1/0238* (2013.01); *G05D 1/0242* (2013.01); *G05D 1/0272* (2013.01); *A47L 2201/04* (2013.01); *A47L 2201/06* (2013.01); *G05D 2201/0203* (2013.01); *G05D 2201/0215* (2013.01)

(58) Field of Classification Search
   CPC .... A47L 9/2805; A47L 2201/04; A47L 9/281; A47L 9/2831; A47L 9/0488; A47L 2201/06; A47L 9/0411; A47L 9/2847; A47L 5/30; H02P 7/29
   USPC ............ 318/568.1, 568.12, 587, 580; 15/319
   See application file for complete search history.

(56) References Cited

U.S. PATENT DOCUMENTS

| | | | |
|---|---|---|---|
| 4,401,909 A * | 8/1983 | Gorsek | A01D 41/1273 310/323.21 |
| 4,674,048 A | 6/1987 | Okamura | |
| 4,829,626 A * | 5/1989 | Harkonen | A47L 5/38 15/314 |
| 4,918,441 A | 4/1990 | Bohman | |
| 4,920,605 A | 5/1990 | Takashima | |
| 5,023,788 A | 6/1991 | Ktazume et al. | |
| 5,109,566 A | 5/1992 | Kobayashi et al. | |
| 5,136,750 A * | 8/1992 | Takashima | A47L 9/2857 15/319 |
| 5,163,202 A * | 11/1992 | Kawakami | A47L 9/2815 15/319 |
| 5,216,777 A * | 6/1993 | Moro | A47L 9/2805 15/319 |
| 5,233,682 A * | 8/1993 | Abe | A47L 9/2815 15/319 |
| 5,251,358 A * | 10/1993 | Moro | A47L 9/281 15/319 |
| 5,284,522 A | 2/1994 | Kobayashi et al. | |
| 5,319,827 A * | 6/1994 | Yang | A47L 9/2842 15/319 |
| 5,369,347 A | 11/1994 | Yoo | |
| 5,410,479 A | 4/1995 | Coker | |
| 5,507,067 A * | 4/1996 | Hoekstra | A47L 9/281 15/319 |
| 5,515,572 A * | 5/1996 | Hoekstra | A47L 9/281 15/319 |
| 5,542,146 A * | 8/1996 | Hoekstra | A47L 9/281 15/319 |
| 5,613,261 A * | 3/1997 | Kawakami | A47L 9/2815 15/319 |
| 5,815,884 A * | 10/1998 | Imamura | A47L 9/19 15/319 |
| 5,910,700 A * | 6/1999 | Crotzer | G01N 29/036 310/316.01 |
| 5,940,927 A * | 8/1999 | Haegermarck | A47L 5/30 15/319 |
| 5,942,869 A | 8/1999 | Katou et al. | |
| 5,959,423 A | 9/1999 | Nakanishi et al. | |
| 6,023,814 A * | 2/2000 | Imamura | A47L 9/2815 15/319 |
| 6,055,702 A * | 5/2000 | Imamura | A47L 9/19 15/319 |
| 6,124,694 A | 9/2000 | Bancroft et al. | |
| 6,142,252 A | 11/2000 | Kinta et al. | |
| 6,167,332 A | 12/2000 | Kurtzberg et al. | |
| 6,278,918 B1 | 8/2001 | Dickson et al. | |
| 6,285,930 B1 | 9/2001 | Dickson et al. | |
| 6,385,515 B1 | 5/2002 | Dickson et al. | |
| 6,389,329 B1 | 5/2002 | Colens | |
| 6,446,302 B1 * | 9/2002 | Kasper | A47L 11/30 15/319 |
| 6,481,515 B1 | 11/2002 | Kirkpatrick et al. | |
| 6,490,539 B1 | 12/2002 | Dickson et al. | |
| 6,532,404 B2 | 3/2003 | Colens | |
| 6,571,422 B1 * | 6/2003 | Gordon | A47L 9/19 15/339 |
| 6,594,844 B2 | 7/2003 | Jones | |
| 6,605,156 B1 * | 8/2003 | Clark | A47L 5/30 134/18 |
| 6,615,108 B1 | 9/2003 | Peless et al. | |
| 6,671,592 B1 * | 12/2003 | Bisset | G05D 1/0214 180/167 |
| 6,690,134 B1 | 2/2004 | Jones et al. | |
| 6,781,338 B2 | 8/2004 | Jones et al. | |
| 6,801,015 B2 | 10/2004 | Bertram et al. | |
| 6,809,490 B2 * | 10/2004 | Jones | G05D 1/0219 318/568.12 |
| 6,810,305 B2 | 10/2004 | Kirkpatrick | |
| 6,841,963 B2 | 1/2005 | Song et al. | |
| 6,956,348 B2 * | 10/2005 | Landry | A47L 9/2805 15/319 |
| 6,965,209 B2 | 11/2005 | Landry et al. | |
| 7,024,278 B2 * | 4/2006 | Chiappetta | G05D 1/0242 15/319 |
| 7,113,847 B2 * | 9/2006 | Chmura | A47L 5/36 318/568.1 |
| 7,155,308 B2 | 12/2006 | Jones | |
| 7,166,983 B2 | 1/2007 | Jung | |
| 7,167,775 B2 | 1/2007 | Abramson et al. | |
| 7,188,000 B2 | 3/2007 | Chiappetta et al. | |
| 7,196,487 B2 | 3/2007 | Jones et al. | |
| 7,233,122 B2 | 6/2007 | Kim et al. | |
| 7,237,298 B2 * | 7/2007 | Reindle | A47L 9/2821 15/319 |
| 7,251,853 B2 | 8/2007 | Park et al. | |
| 7,288,912 B2 | 10/2007 | Landry et al. | |
| 7,320,149 B1 | 1/2008 | Huffman et al. | |
| 7,388,343 B2 | 6/2008 | Jones et al. | |
| 7,389,156 B2 | 6/2008 | Ziegler et al. | |
| 7,424,766 B2 * | 9/2008 | Reindle | A47L 9/2842 15/319 |
| 7,448,113 B2 | 11/2008 | Jones et al. | |
| 7,459,871 B2 | 12/2008 | Landry et al. | |
| 7,571,511 B2 | 8/2009 | Jones et al. | |
| 7,636,982 B2 | 12/2009 | Jones et al. | |

(56) References Cited

U.S. PATENT DOCUMENTS

| | | | |
|---|---|---|---|
| 7,761,954 B2 | 7/2010 | Ziegler | |
| 8,253,368 B2 | 8/2012 | Landry et al. | |
| 8,386,081 B2 | 2/2013 | Landry et al. | |
| 8,428,778 B2 | 4/2013 | Landry et al. | |
| 8,456,125 B2 | 6/2013 | Landry et al. | |
| 8,598,829 B2* | 12/2013 | Landry | A47L 9/2805 15/319 |
| 8,781,626 B2 | 7/2014 | Landry et al. | |
| 9,591,959 B2* | 3/2017 | Landry | A47L 9/2805 |
| 2002/0016649 A1 | 2/2002 | Jones | |
| 2002/0116089 A1 | 8/2002 | Kirkpatrick | |
| 2002/0120364 A1 | 8/2002 | Colens | |
| 2003/0025472 A1* | 2/2003 | Jones | G05D 1/0219 318/568.12 |
| 2003/0026472 A1 | 2/2003 | Abe | |
| 2003/0060928 A1 | 3/2003 | Abramson et al. | |
| 2003/0097875 A1 | 5/2003 | Lentz et al. | |
| 2003/0120389 A1 | 6/2003 | Abramson et al. | |
| 2003/0146739 A1 | 8/2003 | Bertram et al. | |
| 2003/0229421 A1* | 12/2003 | Chmura | A47L 5/36 700/245 |
| 2004/0020000 A1 | 2/2004 | Jones | |
| 2004/0045117 A1 | 3/2004 | Alowonle et al. | |
| 2004/0049877 A1* | 3/2004 | Jones | A47L 5/30 15/319 |
| 2004/0074027 A1* | 4/2004 | Grey | A46B 13/001 15/42 |
| 2004/0111184 A1* | 6/2004 | Chiappetta | G05D 1/0242 700/245 |
| 2004/0111826 A1* | 6/2004 | Grey | A46B 13/001 15/377 |
| 2004/0187249 A1* | 9/2004 | Jones | A47L 5/30 15/319 |
| 2004/0187457 A1 | 9/2004 | Colens | |
| 2004/0204792 A1 | 10/2004 | Taylor et al. | |
| 2004/0207355 A1* | 10/2004 | Jones | G05D 1/0219 318/568.12 |
| 2004/0211444 A1 | 10/2004 | Taylor et al. | |
| 2004/0236468 A1 | 11/2004 | Taylor et al. | |
| 2004/0244138 A1 | 12/2004 | Taylor et al. | |
| 2004/0255411 A1* | 12/2004 | Grey | A46B 13/001 15/42 |
| 2005/0022330 A1 | 2/2005 | Park et al. | |
| 2005/0065662 A1* | 3/2005 | Reindle | A47L 9/2821 701/1 |
| 2005/0067994 A1 | 3/2005 | Jones et al. | |
| 2005/0138764 A1* | 6/2005 | Grey | A46B 13/001 15/377 |
| 2005/0150074 A1 | 7/2005 | Diehl et al. | |
| 2005/0162119 A1* | 7/2005 | Landry | A47L 9/2805 318/580 |
| 2005/0166355 A1 | 8/2005 | Tani | |
| 2005/0171644 A1 | 8/2005 | Tani | |
| 2005/0204505 A1 | 9/2005 | Kashiwagi | |
| 2005/0204717 A1 | 9/2005 | Colens | |
| 2005/0212478 A1 | 9/2005 | Takenaka | |
| 2005/0212680 A1 | 9/2005 | Uehigashi | |
| 2005/0217043 A1* | 10/2005 | Grey | A46B 13/001 15/42 |
| 2005/0234595 A1 | 10/2005 | Tani | |
| 2005/0278888 A1* | 12/2005 | Reindle | A47L 9/2842 15/319 |
| 2006/0000040 A1* | 1/2006 | Grey | A47L 11/32 15/42 |
| 2006/0056677 A1 | 3/2006 | Tani | |
| 2006/0085095 A1* | 4/2006 | Reindle | A47L 9/2821 700/258 |
| 2006/0136096 A1* | 6/2006 | Chiappetta | G05D 1/0242 700/245 |
| 2006/0238157 A1 | 10/2006 | Kim et al. | |
| 2006/0238159 A1 | 10/2006 | Jung | |
| 2006/0241814 A1 | 10/2006 | Jung | |
| 2006/0253224 A1 | 11/2006 | Tani et al. | |
| 2006/0259212 A1 | 11/2006 | Jeon | |
| 2007/0069680 A1* | 3/2007 | Landry | A47L 9/2805 318/580 |
| 2007/0096676 A1 | 5/2007 | Im et al. | |
| 2007/0266508 A1 | 11/2007 | Jones et al. | |
| 2008/0140255 A1 | 6/2008 | Ziegler et al. | |
| 2008/0155768 A1 | 7/2008 | Ziegler et al. | |
| 2008/0172820 A1* | 7/2008 | Yoo | A47L 9/0494 15/319 |
| 2008/0307590 A1 | 12/2008 | Jones et al. | |
| 2010/0049365 A1 | 2/2010 | Jones et al. | |
| 2010/0257690 A1 | 10/2010 | Jones et al. | |
| 2010/0257691 A1 | 10/2010 | Jones et al. | |
| 2010/0263158 A1 | 10/2010 | Jones et al. | |
| 2012/0047676 A1* | 3/2012 | Jung | A47L 9/2805 15/319 |
| 2012/0246862 A1* | 10/2012 | Landry | A47L 9/2805 15/319 |
| 2012/0260944 A1* | 10/2012 | Martins, Jr. | A47L 5/14 134/18 |
| 2015/0374188 A1* | 12/2015 | Landry | A47L 9/2805 15/21.1 |

FOREIGN PATENT DOCUMENTS

| | | |
|---|---|---|
| JP | 62-292126 | 12/1978 |
| JP | 04-084921 | 3/1992 |
| JP | 04-263816 | 9/1992 |
| JP | 04-300516 | 10/1992 |
| JP | 06-38912 | 2/1994 |
| JP | 199530887 | 11/1995 |
| JP | 2000-60782 | 2/2000 |
| JP | 2002-204769 | 7/2002 |
| JP | 2002-369778 | 12/2002 |
| JP | 2003-310489 | 11/2003 |

OTHER PUBLICATIONS

"Welcome to the Electrolux Trilobite," Electrolux, accessed online <http://electroluxusa.com/node57.asp?current URL=node142.asp%3F> Mar. 18, 2005, 2 pages.

Doty, K. L., and Harrison R. R., Sweep Strategies for a Sensory-Driven, Behavior-Based Vacuum Cleaning Agent, AAAI 1993 Fall Symposium Series, Instantiating Real-World Agents, Research Triangle Park, Raleigh, NC, Oct. 22-24, 1993, pp. 1-6.

Everett, H.R. (1995). Sensors for Mobile Robots. AK Peters, Ltd., Wellesley, MA.

Hitachi: News release: The home cleaning robot of the autonomous movement type (experimental machine) is developed. May 29, 2003. Accessed online Mar. 18, 2005 <http://www.i4u.com/japanreleases/hitachirobot.htm> 5 pages.

Honda Motor Co., Ltd., English Translation of JP11212642, Aug. 9, 1999, 31 pages.

Jones, J., Roth, D. (Jan. 2, 2004). Robot Programming: A Practical Guide to Behavior-Based Robotics. McGraw-Hill Education TAB: 288 pages.

Karcher RC 3000 Robotic Cleaner, Product page, accessed online <http://www.karcher-usa.com/showproducts.php?op=view_prod&param1=143&param2=&param3=> Mar. 18, 2005, 3 pages.

Karcher RoboCleaner RC 3000, Dec. 12, 2003, 4 pages.

Karcher, Product Manual Download, 2003, 16 pages.

Prassler, et al., English Translation of DE19849978, Feb. 8, 2001, 16 pages.

\* cited by examiner

DETECT LEFT AND RIGHT DEBRIS SIGNALS REPRESENTATIVE OF INSTANTANEOUS DEBRIS STRIKES/PRESENCE/QUANTITY/VOLUME/ DIRECTION OF/VECTOR TO DEBRIS OR DEBRIS FIELD, 802

SELECT OPERATIONAL MODE OR PATTERN OF MOVEMENT (e.g., SPOT MODE) BASED ON DEBRIS SIGNAL VALUES, 804

SELECT DIRECTION OF MOVEMENT BASED ON DIFFERENTIAL (LEFT/RIGHT) SIGNAL VALUES (e.g., STEERING TOWARD SIDE WITH MORE DEBRIS), 806

GENERATE USER PERCEPTIBLE SIGNAL (e.g., ILLUMINATE AN LED OR LIGHT), 808

VARY OR CONTROL OPERATIONAL CONDITION (POWER/OTHER), 810

CALCULATE DEBRIS GRADIENT AND CONTROL MOVEMENT, 812

FIG. 8

DEBRIS SENSOR FOR CLEANING APPARATUS

CROSS-REFERENCE TO RELATED APPLICATIONS

This application for patent is a Continuation of U.S. patent application Ser. No. 14/824,940 filed Aug. 12, 2015 (which issued Mar. 14, 2017 as U.S. Pat. No. 9,591,959), which is a Continuation of U.S. patent application Ser. No. 13/893,038 filed May 13, 2013 (which issued Sep. 29, 2015 as U.S. Pat. No. 9,144,361), which is a Continuation of U.S. patent application Ser. No. 13/523,109 filed Jun. 14, 2012 (which issued Dec. 3, 2013 as U.S. Pat. No. 8,598,829), which is a Continuation of U.S. patent application Ser. No. 12/255,393 filed Oct. 21, 2008 (which issued Feb. 19, 2013 as U.S. Pat. No. 8,378,613), which is a Continuation of U.S. application Ser. No. 11/860,272 filed Sep. 24, 2007 (which issued Dec. 2, 2008 as U.S. Pat. No. 7,459,871), which is a Continuation of U.S. patent application Ser. No. 11/533,294 filed Sep. 19, 2006 (which issued Oct. 30, 2007 as U.S. Pat. No. 7,288,912), which is a Continuation of U.S. patent application Ser. No. 11/109,832 filed Apr. 19, 2005 (abandoned), which is a continuation of patent application Ser. No. 10/766,303 filed Jan. 28, 2004 (which issued Oct. 18, 2005 as U.S. Pat. No. 6,956,348); and is related to the following commonly-owned U.S. patent applications or patents, incorporated by reference as if fully set forth herein:

U.S. patent application Ser. No. 09/768,773 filed Jan. 24, 2001, now U.S. Pat. No. 6,594,844, entitled Robot Obstacle Detection System; U.S. Provisional Patent Application Ser. No. 60/345,764 filed Jan. 3, 2002, entitled Cleaning Mechanisms for Autonomous Robot; U.S. patent application Ser. No. 10/056,804, filed Jan. 24, 2002, entitled Method and System for Robot Localization and Confinement; U.S. patent application Ser. No. 10/167,851 filed Jun. 12, 2002, entitled Method and System for Multi-Mode Coverage for an Autonomous Robot; U.S. patent application Ser. No. 10/320,729 filed Dec. 16, 2002, entitled Autonomous Floor-Cleaning Robot; and U.S. patent application Ser. No. 10/661,835 filed Sep. 12, 2003, entitled Navigational Control System for Robotic Device.

FIELD OF THE INVENTION

The present invention relates generally to cleaning apparatus, and, more particularly, to a debris sensor for sensing instantaneous strikes by debris in a cleaning path of a cleaning apparatus and for enabling control of an operational mode of the cleaning apparatus. The term "debris" is used herein to collectively denote dirt, dust and/or other particulates or objects that might be collected by a vacuum cleaner or other cleaning apparatus, whether autonomous or non-autonomous.

BACKGROUND OF THE INVENTION

Debris sensors, including some suitable for cleaning apparatus, are known in the art. Debris sensors can be useful in autonomous cleaning devices like those disclosed in the above-referenced patent applications, and can also be useful in non-autonomous cleaning devices, whether to indicate to the user that a particularly dirty area is being entered, to increase a power setting in response to detection of debris, or to modify some other operational setting.

Examples of debris sensors are disclosed in the following:

| | |
|---|---|
| De Brey | 3,674,316 |
| De Brey | 3,989,311 |
| De Brey | 4,175,892 |
| Kurz | 4,601,082 |
| Westergren | 4,733,430 |
| Martin | 4,733,431 |
| Harkonen | 4,829,626 |
| Takashima | 5,105,502 |
| Takashima | 5,136,750 |
| Kawakami | 5,163,202 |
| Yang | 5,319,827 |
| Kim | 5,440,216 |
| Gordon | 5,608,944 |
| Imamura | 5,815,884 |
| Imamura | 6,023,814 |
| Kasper | 6,446,302 |
| Gordon | 6,571,422 |

Among the examples disclosed therein, many such debris sensors are optical in nature, using a light emitter and detector. In typical designs used in, e.g., a vacuum cleaner, the light transmitter and the light receiver of the optical sensor are positioned such that they are exposed into the suction passage or cleaning pathway through which dust flows. During usage of the vacuum cleaner, therefore, dust particles tend to adhere to the exposed surfaces of the light transmitter and the light receiver, through which light is emitted and detected, eventually degrading the performance of the optical sensor.

Accordingly, it would be desirable to provide a debris sensor that is not subject to degradation by accretion of debris.

In addition, debris sensors typical of the prior art are sensitive to a level of built-up debris in a reservoir or cleaning pathway, but not particularly sensitive to instantaneous debris strikes or encounters.

It would therefore be desirable to provide a debris sensor that is capable of instantaneously sensing and responding to debris strikes, and which is immediately responsive to debris on a floor or other surface to be cleaned, with reduced sensitivity to variations in airflow, instantaneous power, or other operational conditions of the cleaning device.

It would be also be useful to provide an autonomous cleaning device having operational modes, patterns of movement or behaviors responsive to detected debris, for example, by steering the device toward "dirtier" areas based on signals generated by a debris sensor.

In addition, it would be desirable to provide a debris sensor that could be used to control, select or vary operational modes of either an autonomous or non-autonomous cleaning apparatus.

SUMMARY OF THE INVENTION

The present invention provides a debris sensor, and apparatus utilizing such a debris sensor, wherein the sensor is instantaneously responsive to debris strikes, and can be used to control, select or vary the operational mode of an autonomous or non-autonomous cleaning apparatus containing such a sensor.

One aspect of the invention is an autonomous cleaning apparatus including a drive system operable to enable movement of the cleaning apparatus; a controller in communication with the drive system, the controller including a processor operable to control the drive system to provide at least one pattern of movement of the cleaning apparatus; and a debris sensor for generating a debris signal indicating that the cleaning apparatus has encountered debris; wherein the processor is responsive to the debris signal to select an operative mode from among predetermined operative modes of the cleaning apparatus.

The selection of operative mode could include selecting a pattern of movement of the cleaning apparatus.

The pattern of movement can include spot coverage of an area containing debris, or steering the cleaning apparatus toward an area containing debris. The debris sensor could include spaced-apart first and second debris sensing elements respectively operable to generate first and second debris signals; and the processor can be responsive to the respective first and second debris signals to select a pattern of movement, such as steering toward a side (e.g., left or right side) with more debris.

The debris sensor can include a piezoelectric sensor element located proximate to a cleaning pathway of the cleaning apparatus and responsive to a debris strike to generate a signal indicative of such strike.

The debris sensor of the invention can also be incorporated into a non-autonomous cleaning apparatus. This aspect of the invention can include a piezoelectric sensor located proximate to a cleaning pathway and responsive to a debris strike to generate a debris signal indicative of such strike; and a processor responsive to the debris signal to change an operative mode of the cleaning apparatus. The change in operative mode could include illuminating a user-perceptible indicator light, changing a power setting (e.g., higher power setting when more debris is encountered), or slowing or reducing a movement speed of the apparatus.

A further aspect of the invention is a debris sensor, including a piezoelectric element located proximate to or within a cleaning pathway of the cleaning apparatus and responsive to a debris strike to generate a first signal indicative of such strike; and a processor operable to process the first signal to generate a second signal representative of a characteristic of debris being encountered by the cleaning apparatus. That characteristic could be, for example, a quantity or volumetric parameter of the debris, or a vector from a present location of the cleaning apparatus to an area containing debris.

Another aspect of the invention takes advantage of the motion of an autonomous cleaning device across a floor or other surface, processing the debris signal in conjunction with knowledge of the cleaning device's movement to calculate a debris gradient. The debris gradient is representative of changes in debris strikes count as the autonomous cleaning apparatus moves along a surface. By examining the sign of the gradient (positive or negative, associated with increasing or decreasing debris), an autonomous cleaning device controller can continuously adjust the path or pattern of movement of the device to clean a debris field most effectively.

These and other aspects, features and advantages of the invention will become more apparent from the following description, in conjunction with the accompanying drawings, in which embodiments of the invention are shown and described by way of illustrative example.

BRIEF DESCRIPTION OF THE DRAWINGS

A more complete understanding of the present invention and the attendant features and advantages thereof may be had by reference to the following detailed description of the invention when considered in conjunction with the accompanying drawings wherein:

FIG. 6 is a schematic diagram of signal processing circuitry for the debris sensor architecture of FIG. 5.

FIG. 8 is a flowchart of a method according to one practice of the invention.

DETAILED DESCRIPTION OF THE INVENTION

Figure 1:
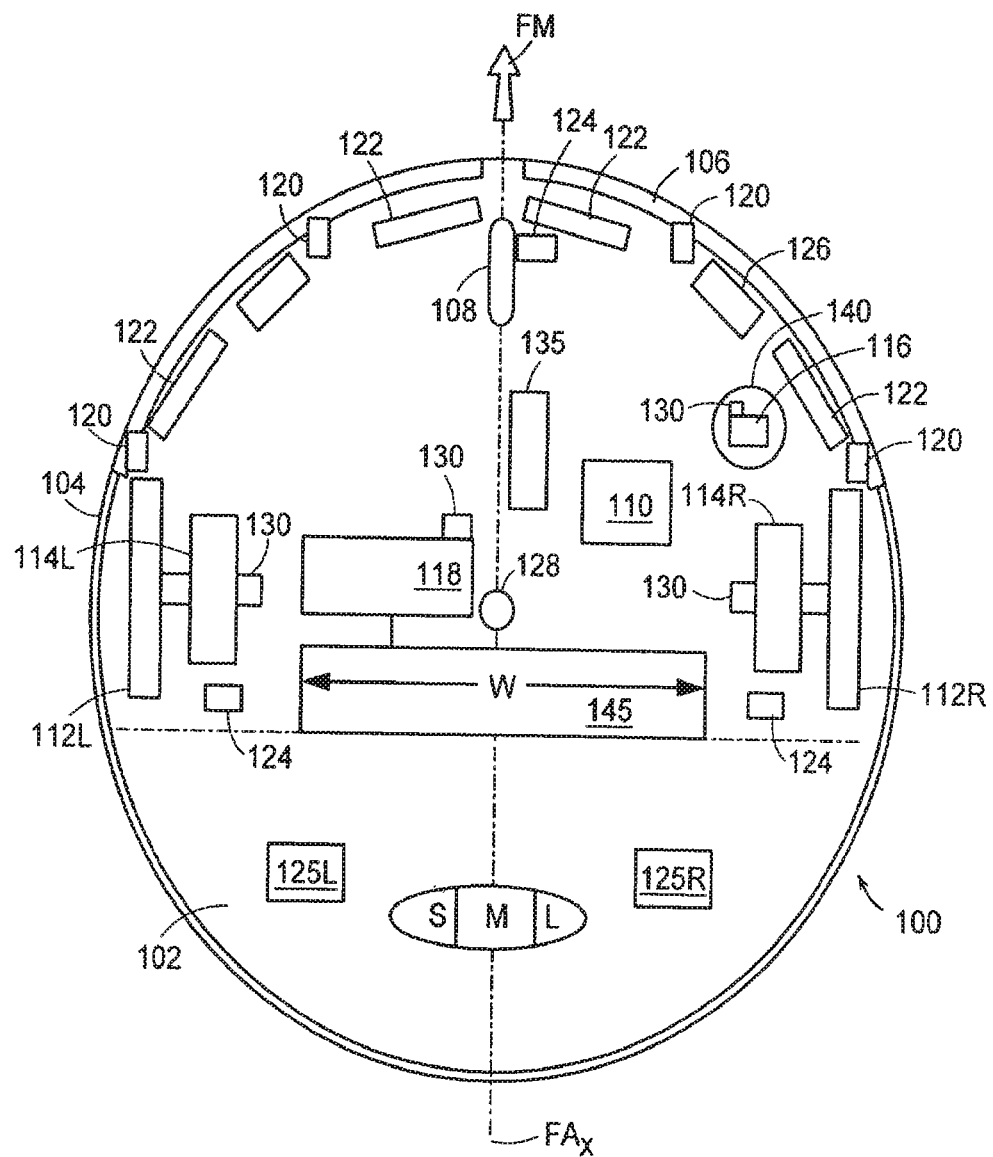
FIG. 1 is a top-view schematic of an exemplary autonomous cleaning device in which the debris sensor of the invention can be employed.

While the debris sensor of the present invention can be incorporated into a wide range of autonomous cleaning devices (and indeed, into non-autonomous cleaning devices as shown by way of example in FIG. 7), it will first be described in the context of an exemplary autonomous cleaning device shown in FIGS. 1-3. Further details of the structure, function and behavioral modes of such an autonomous cleaning device are set forth in the patent applications cited above in the Cross-Reference section, each of which is incorporated herein by reference. Accordingly, the following detailed description is organized into the following sections:

I. Exemplary Autonomous Cleaning Device
II. Behavioral Modes of an Autonomous Cleaning Device
III. Debris Sensor Structure
IV. Signal Processing
V. Conclusions
I. Autonomous Cleaning Device Referring now to the drawings wherein like reference numerals identify corresponding or similar elements throughout the several views, FIG. 1 is a top-view schematic of an exemplary autonomous cleaning device 100 in which a debris sensor according to the present invention may be incorporated. FIG. 2 is a block diagram of the hardware of the robot device 100 of FIG. 1.

Examples of hardware and behavioral modes (coverage behaviors or patterns of movement for cleaning operations; escape behaviors for transitory movement patterns; and safety behaviors for emergency conditions) of an autonomous cleaning device 100 marketed by the iRobot Corporation of Burlington, Mass. under the ROOMBA trademark, will next be described to provide a more complete understanding of how the debris sensing system of the present invention may be employed. However, the invention can also be employed in non-autonomous cleaning devices, and an example is described below in connection with FIG. 7.

In the following description, the terms "forward" and "fore" are used to refer to the primary direction of motion (forward) of the robotic device (see arrow identified by reference character "FM" in FIG. 1). The fore/aft axis FA.sub.X of the robotic device 100 coincides with the medial diameter of the robotic device 100 that divides the robotic device 100 into generally symmetrical right and left halves, which are defined as the dominant and non-dominant sides, respectively.

An example of such a robotic cleaning device 100 has a generally disk-like housing infrastructure that includes a chassis 102 and an outer shell 104 secured to the chassis 102 that define a structural envelope of minimal height (to facilitate movement under furniture). The hardware comprising the robotic device 100 can be generally categorized as the functional elements of a power system, a motive power system (also referred to herein as a "drive system"), a sensor system, a control module, a side brush assembly, or a self-adjusting cleaning head system, respectively, all of which are integrated in combination with the housing infrastructure. In addition to such categorized hardware, the robotic device 100 further includes a forward bumper 106 having a generally arcuate configuration and a nose-wheel assembly 108.

The forward bumper 106 (illustrated as a single component; alternatively, a two-segment component) is integrated in movable combination with the chassis 102 (by means of displaceable support members pairs) to extend outwardly therefrom. Whenever the robotic device 100 impacts an obstacle (e.g., wall, furniture) during movement thereof, the bumper 106 is displaced (compressed) towards the chassis 102 and returns to its extended (operating) position when contact with the obstacle is terminated.

The nose-wheel assembly 108 is mounted in biased combination with the chassis 102 so that the nose-wheel subassembly 108 is in a retracted position (due to the weight of the robotic device 100) during cleaning operations wherein it rotates freely over the surface being cleaned. When the nose-wheel subassembly 108 encounters a drop-off during operation (e.g., descending stairs, split-level floors), the nose-wheel assembly 108 is biased to an extended position.

The hardware of the power system, which provides the energy to power the electrically-operated hardware of the robotic device 100, comprises a rechargeable battery pack 110 (and associated conduction lines, not shown) that is integrated in combination with the chassis 102.

As shown in FIG. 1, the motive power system provides the means that propels the robotic device 100 and operates the cleaning mechanisms, e.g., side brush assembly and the self-adjusting cleaning head system, during movement of the robotic device 100. The motive power system comprises left and right main drive wheel assemblies 112L, 112R, their associated independent electric motors 114L, 114R, and electric motors 116, 118 for operation of the side brush assembly and the self-adjusting cleaning head subsystem, respectively.

The electric motors 114L, 114R are mechanically coupled to the main drive wheel assemblies 112L, 112R, respectively, and independently operated by control signals generated by the control module as a response to the implementation of a behavioral mode, or, as discussed in greater detail below, in response to debris signals generated by left and right debris sensors 125L, 125R shown in FIG. 1.

Independent operation of the electric motors 114L, 114R allows the main wheel assemblies 112L, 112R to be: (1) rotated at the same speed in the same direction to propel the robotic device 100 in a straight line, forward or aft; (2) differentially rotated (including the condition wherein one wheel assembly is not rotated) to effect a variety of right and/or left turning patterns (over a spectrum of sharp to shallow turns) for the robotic device 100; and (3) rotated at the same speed in opposite directions to cause the robotic device 100 to turn in place, i.e., "spin on a dime", to provide an extensive repertoire of movement capability for the robotic device 100.

As shown in FIG. 1, the sensor system comprises a variety of different sensor units that are operative to generate signals that control the behavioral mode operations of the robotic device 100. The described robotic device 100 includes obstacle detection units 120, cliff detection units 122, wheel drop sensors 124, an obstacle-following unit 126, a virtual wall omnidirectional detector 128, stall-sensor units 130, main wheel encoder units 132, and, in accordance with the present invention, left and right debris sensors 125L and 125R described in greater detail below.

In the illustrated embodiment, the obstacle ("bump") detection units 120 can be IR break beam sensors mounted in combination with the displaceable support member pairs of the forward bumper 106. These detection units 120 are operative to generate one or more signals indicating relative displacement between one or more support member pairs whenever the robotic device 100 impacts an obstacle such that the forward bumper 106 is compressed. These signals are processed by the control module to determine an approximate point of contact with the obstacle relative to the fore-aft axis FAX of the robotic device 100 (and the behavioral mode(s) to be implemented).

The cliff detection units 122 are mounted in combination with the forward bumper 106. Each cliff detection unit 122 comprises an IR emitter-detector pair configured and operative to establish a focal point such that radiation emitted downwardly by the emitter is reflected from the surface being traversed and detected by the detector. If reflected radiation is not detected by the detector, i.e., a drop-off is encountered, the cliff detection unit 122 transmits a signal to the control module (which causes one or more behavioral modes to be implemented).

wheel drop sensor 124 such as a contact switch is integrated in combination with each of the main drive wheel assemblies 112L, 112R and the nose wheel assembly 108 and is operative to generate a signal whenever any of the wheel assemblies is in an extended position, i.e., not in contact with the surface being traversed, (which causes the control module to implement one or more behavioral modes).

The obstacle-following unit 126 for the described embodiment is an IR emitter-detector pair mounted on the 'dominant' side (right hand side of FIG. 1) of the robotic device 100. The emitter-detector pair is similar in configuration to the cliff detection units 112, but is positioned so that the emitter emits radiation laterally from the dominant side of the robotic device 100. The unit 126 is operative to transmit a signal to the control module whenever an obstacle is detected as a result of radiation reflected from the obstacle and detected by the detector. The control module, in response to this signal, causes one or more behavioral modes to be implemented.

A virtual wall detection system for use in conjunction with the described embodiment of the robotic device 100 comprises an omnidirectional detector 128 mounted atop the outer shell 104 and a stand-alone transmitting unit (not shown) that transmits an axially-directed confinement beam. The stand-alone transmitting unit is positioned so that the emitted confinement beam blocks an accessway to a defined working area, thereby restricting the robotic device 100 to operations within the defined working area (e.g., in a doorway to confine the robotic device 100 within a specific room to be cleaned). Upon detection of the confinement beam, the omnidirectional detector 128 transmits a signal to the control module (which causes one or more behavioral modes to be implemented to move the robotic device 100 away from the confinement beam generated by the stand-alone transmitting unit).

A stall sensor unit 130 is integrated in combination with each electric motor 114L, 114R, 116, 118 and operative to transmit a signal to the control module when a change in current is detected in the associated electric motor (which is indicative of a dysfunctional condition in the corresponding driven hardware). The control module is operative in response to such a signal to implement one or more behavioral modes.

An IR encoder unit 132 (see FIG. 2) is integrated in combination with each main wheel assembly 112L, 112R and operative to detect the rotation of the corresponding wheel and transmit signals corresponding thereto the control module (wheel rotation can be used to provide an estimate of distance traveled for the robotic device 100). Control Module: Referring now to FIG. 2, the control module comprises the microprocessing unit 135 that includes I/O ports connected to the sensors and controllable hardware of the robotic device 100, a microcontroller (such as a Motorola MC9512E128CPV 16-bit controller), and ROM and RAM memory. The I/O ports function as the interface between the microcontroller and the sensor units (including left and right debris sensors 125 discussed in greater detail below) and controllable hardware, transferring signals generated by the sensor units to the microcontroller and transferring control (instruction) signals generated by the microcontroller to the controllable hardware to implement a specific behavioral mode.

The microcontroller is operative to execute instruction sets for processing sensor signals, implementing specific behavioral modes based upon such processed signals, and generating control (instruction) signals for the controllable hardware based upon implemented behavioral modes for the robotic device 100. The cleaning coverage and control programs for the robotic device 100 are stored in the ROM of the microprocessing unit 135, which includes the behavioral modes, sensor processing algorithms, control signal generation algorithms and a prioritization algorithm for determining which behavioral mode or modes are to be given control of the robotic device 100. The RAM of the microprocessing unit 135 is used to store the active state of the robotic device 100, including the ID of the behavioral mode(s) under which the robotic device 100 is currently being operated and the hardware commands associated therewith.

Referring again to FIG. 1, there is shown a brush assembly 140, configured and operative to entrain particulates outside the periphery of the housing infrastructure and to direct such particulates towards the self-adjusting cleaning head system. The side brush assembly 140 provides the robotic device 100 with the capability of cleaning surfaces adjacent to base-boards when the robotic device is operated in an Obstacle-Following behavioral mode. As shown in FIG. 1, the side brush assembly 140 is preferably mounted in combination with the chassis 102 in the forward quadrant on the dominant side of the robotic device 100.

The self-adjusting cleaning head system 145 for the described robotic device 100 comprises a dual-stage brush assembly and a vacuum assembly, each of which is independently powered by an electric motor (reference numeral 118 in FIG. 1 actually identifies two independent electric motors—one for the brush assembly and one for the vacuum assembly). The cleaning capability of the robotic device 100 is commonly characterized in terms of the width of the cleaning head system 145 (see reference character W in FIG. 1).

Figure 3:
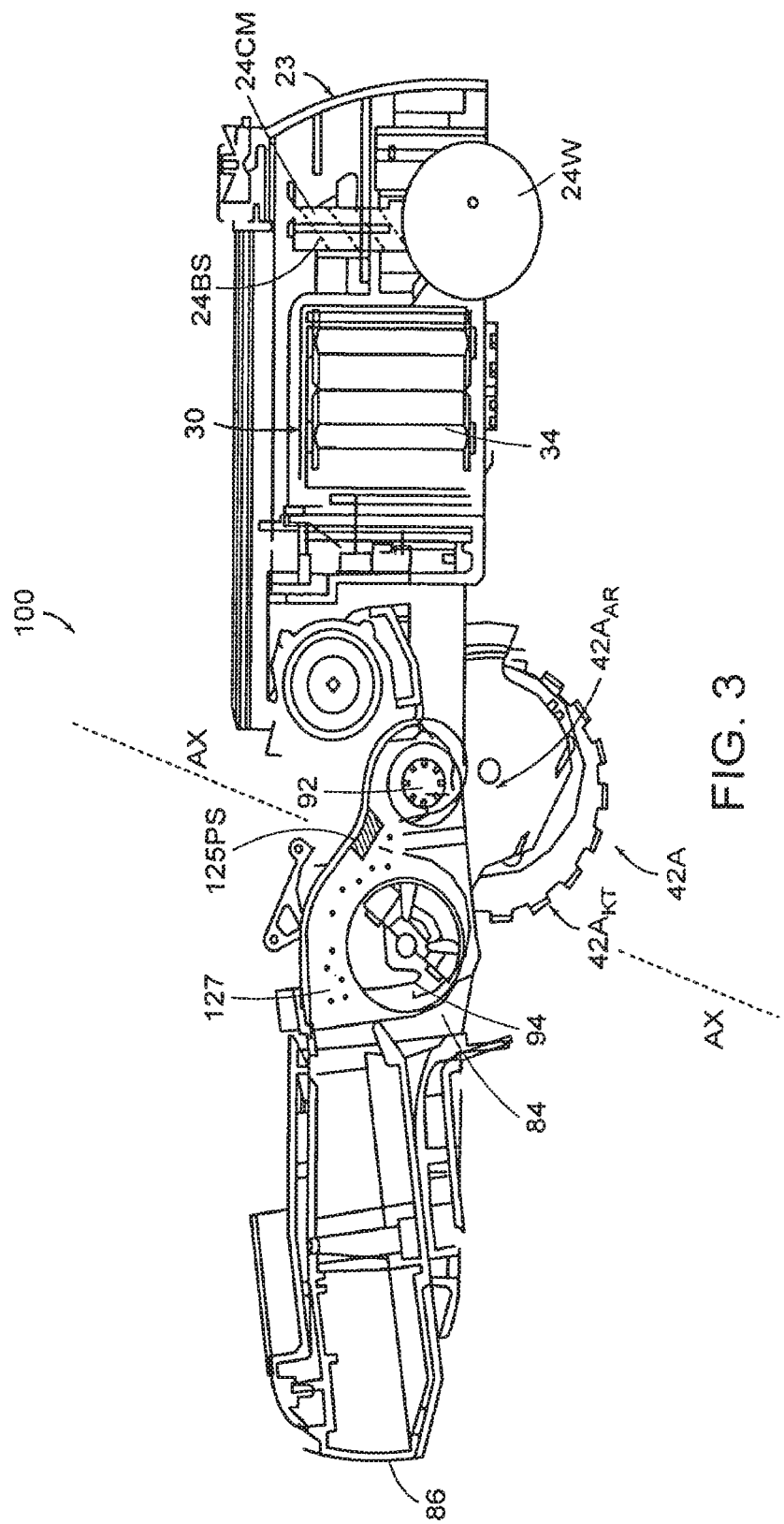
FIG. 3 is a side view of the robotic device of FIG. 1, showing a debris sensor according to the invention situated in a cleaning or vacuum pathway, where it will be struck by debris upswept by the main cleaning brush element.

Referring now to FIG. 3, in one embodiment of a robotic cleaning device, the cleaning brush assembly comprises asymmetric, counter-rotating flapper and main brush elements 92 and 94, respectively, that are positioned forward of the vacuum assembly inlet 84, and operative to direct particulate debris 127 into a removable dust cartridge 86. As shown in FIG. 3, the autonomous cleaning apparatus can also include left and right debris sensor elements 125PS, which can be piezoelectric sensor elements, as described in detail below. The piezoelectric debris sensor elements 125PS can be situated in a cleaning pathway of the cleaning device, mounted, for example, in the roof of the cleaning head, so that when struck by particles 127 swept up by the brush elements and/or pulled up by vacuum, the debris sensor elements 125PS generate electrical pulses representative of debris impacts and thus, of the presence of debris in an area in which the autonomous cleaning device is operating.

More particularly, in the arrangement shown in FIG. 3, the sensor elements 125PS are located substantially at an axis AX along which main and flapper brushes 94, 92 meet, so that particles strike the sensor elements 125PS with maximum force.

As shown in FIG. 1, and described in greater detail below, the robotic cleaning device can be fitted with left and right side piezoelectric debris sensors, to generate separate left and right side debris signals that can be processed to signal the robotic device to turn in the direction of a "dirty" area.

The operation of the piezoelectric debris sensors, as well as signal processing and selection of behavioral modes based on the debris signals they generate, will be discussed below following a brief discussion of general aspects of behavioral modes for the cleaning device.

II. Behavioral Modes

The robotic device 100 can employ a variety of behavioral modes to effectively clean a defined working area where behavioral modes are layers of control systems that can be operated in parallel. The microprocessor unit 135 is operative to execute a prioritized arbitration scheme to identify and implement one or more dominant behavioral modes for any given scenario based upon inputs from the sensor system.

The behavioral modes for the described robotic device 100 can be characterized as: (1) coverage behavioral modes; (2) escape behavioral modes; and (3) safety behavioral modes. Coverage behavioral modes are primarily designed to allow the robotic device 100 to perform its cleaning operations in an efficient and effective manner and the escape and safety behavioral modes are priority behavioral modes implemented when a signal from the sensor system indicates that normal operation of the robotic device 100 is impaired, e.g., obstacle encountered, or is likely to be impaired, e.g., drop-off detected.

Representative and illustrative coverage behavioral (cleaning) modes for the robotic device 100 include: (1) a Spot Coverage pattern; (2) an Obstacle-Following (or Edge-Cleaning) Coverage pattern, and (3) a Room Coverage pattern. The Spot Coverage pattern causes the robotic device 100 to clean a limited area within the defined working area, e.g., a high-traffic area. In a preferred embodiment the Spot Coverage pattern is implemented by means of a spiral algorithm (but other types of self-bounded area algorithms, e.g., polygonal, can be used). The spiral algorithm, which causes outward spiraling (preferred) or inward spiraling movement of the robotic device 100, is implemented by control signals from the microprocessing unit 135 to the main wheel assemblies 112L, 112R to change the turn radius/radii thereof as a function of time (thereby increasing/decreasing the spiral movement pattern of the robotic device 100).

The robotic device 100 is operated in the Spot Coverage pattern for a predetermined or random period of time, for a predetermined or random distance (e.g., a maximum spiral distance) and/or until the occurrence of a specified event, e.g., activation of one or more of the obstacle detection units 120 (collectively a transition condition). Once a transition condition occurs, the robotic device 100 can implement or transition to a different behavioral mode, e.g., a Straight Line behavioral mode (in a preferred embodiment of the robotic device 100, the Straight Line behavioral mode is a low priority, default behavior that propels the robot in an approximately straight line at a preset velocity of approximately 0.306 m/s) or a Bounce behavioral mode in combination with a Straight Line behavioral mode.

If the transition condition is the result of the robotic device 100 encountering an obstacle, the robotic device 100 can take other actions in lieu of transitioning to a different behavioral mode. The robotic device 100 can momentarily implement a behavioral mode to avoid or escape the obstacle and resume operation under control of the spiral algorithm (i.e., continue spiraling in the same direction). Alternatively, the robotic device 100 can momentarily implement a behavioral mode to avoid or escape the obstacle and resume operation under control of the spiral algorithm (but in the opposite direction-reflective spiraling).

The Obstacle-Following Coverage pattern causes the robotic device 100 to clean the perimeter of the defined working area, e.g., a room bounded by walls, and/or the perimeter of an obstacle (e.g., furniture) within the defined working area. Preferably the robotic device 100 of FIG. 1 utilizes obstacle-following unit 126 (see FIG. 1) to continuously maintain its position with respect to an obstacle, e.g., wall, furniture, so that the motion of the robotic device 100 causes it to travel adjacent to and concomitantly clean along the perimeter of the obstacle. Different embodiments of the obstacle-following unit 126 can be used to implement the Obstacle-Following behavioral pattern.

In a first embodiment, the obstacle-following unit 126 is operated to detect the presence or absence of the obstacle. In an alternative embodiment, the obstacle-following unit 126 is operated to detect an obstacle and then maintain a predetermined distance between the obstacle and the robotic device 100. In the first embodiment, the microprocessing unit 135 is operative, in response to signals from the obstacle-following unit, to implement small CW or CCW turns to maintain its position with respect to the obstacle. The robotic device 100 implements a small CW when the robotic device 100 transitions from obstacle detection to non-detection (reflection to non-reflection) or to implement a small CCW turn when the robotic device 100 transitions from non-detection to detection (non-reflection to reflection). Similar turning behaviors are implemented by the robotic device 100 to maintain the predetermined distance from the obstacle.

The robotic device 100 is operated in the Obstacle-Following behavioral mode for a predetermined or random period of time, for a predetermined or random distance (e.g., a maximum or minimum distance) and/or until the occurrence of a specified event, e.g., activation of one or more of the obstacle detection units 120 a predetermined number of times (collectively a transition condition). In certain embodiments, the microprocessor 135 will cause the robotic device to implement an Align behavioral mode upon activation of the obstacle-detection units 120 in the Obstacle-Following behavioral mode wherein the implements a minimum angle CCW turn to align the robotic device 100 with the obstacle.

The Room Coverage pattern can be used by the robotic device 100 to clean any defined working area that is bounded by walls, stairs, obstacles or other barriers (e.g., a virtual wall unit). A preferred embodiment for the Room Coverage pattern comprises the Random-Bounce behavioral mode in combination with the Straight Line behavioral mode. Initially, the robotic device 100 travels under control of the Straight-Line behavioral mode, i.e., straight-line algorithm (main drive wheel assemblies 112L, 112R operating at the same rotational speed in the same direction) until an obstacle is encountered. Upon activation of one or more of the obstacle detection units 120, the microprocessing unit 135 is operative to compute an acceptable range of new directions based upon the obstacle detection unit(s) 126 activated. The microprocessing unit 135 selects a new heading from within the acceptable range and implements a CW or CCW turn to achieve the new heading with minimal movement. In some embodiments, the new turn heading may be followed by forward movement to increase the cleaning efficiency of the robotic device 100. The new heading may be randomly selected across the acceptable range of headings, or based upon some statistical selection scheme, e.g., Gaussian distribution. In other embodiments of the Room Coverage behavioral mode, the microprocessing unit 135 can be programmed to change headings randomly or at predetermined times, without input from the sensor system.

The robotic device 100 is operated in the Room Coverage behavioral mode for a predetermined or random period of time, for a predetermined or random distance (e.g., a maximum or minimum distance) and/or until the occurrence of a specified event, e.g., activation of the obstacle-detection units 120 a predetermined number of times (collectively a transition condition).

By way of example, the robotic device 100 can include four escape behavioral modes: a Turn behavioral mode, an Edge behavioral mode, a Wheel Drop behavioral mode, and a Slow behavioral mode. One skilled in the art will appreciate that other behavioral modes can be utilized by the robotic device 100. One or more of these behavioral modes may be implemented, for example, in response to a current rise in one of the electric motors 116, 118 of the side brush assembly 140 or dual-stage brush assembly above a low or high stall threshold, forward bumper 106 in compressed position for determined time period, detection of a wheel-drop event.

In the Turn behavioral mode, the robotic device 100 turns in place in a random direction, starting at higher velocity (e.g., twice normal turning velocity) and decreasing to a lower velocity (one-half normal turning velocity), i.e., small panic turns and large panic turns, respectively. Low panic turns are preferably in the range of 45.degree. to 90.degree., large panic turns are preferably in the range of 90.degree. to 270.degree. The Turn behavioral mode prevents the robotic device 100 from becoming stuck on room impediments, e.g., high spot in carpet, ramped lamp base, from becoming stuck under room impediments, e.g., under a sofa, or from becoming trapped in a confined area.

In the Edge behavioral mode follows the edge of an obstacle unit it has turned through a predetermined number of degrees, e.g., 60.degree., without activation of any of the obstacle detection units 120, or until the robotic device has turned through a predetermined number of degrees, e.g., 170.degree., since initiation of the Edge behavioral mode. The Edge behavioral mode allows the robotic device 100 to move through the smallest possible openings to escape from confined areas.

In the wheel Drop behavioral mode, the microprocessor 135 reverses the direction of the main wheel drive assemblies 112L, 112R momentarily, then stops them. If the activated wheel drop sensor 124 deactivates within a predetermined time, the microprocessor 135 then reimplements the behavioral mode that was being executed prior to the activation of the wheel drop sensor 124.

In response to certain events, e.g., activation of a wheel drop sensor 124 or a cliff detector 122, the Slow behavioral mode is implemented to slowed down the robotic device 100 for a predetermined distance and then ramped back up to its normal operating speed.

When a safety condition is detected by the sensor subsystem, e.g., a series of brush or wheel stalls that cause the corresponding electric motors to be temporarily cycled off, wheel drop sensor 124 or a cliff detection sensor 122 activated for greater that a predetermined period of time, the robotic device 100 is generally cycled to an off state. In addition, an audible alarm may be generated.

The foregoing description of behavioral modes for the robotic device 100 is merely representative of the types of operating modes that can be implemented by the robotic device 100. One skilled in the art will appreciate that the behavioral modes described above can be implemented in other combinations and/or circumstances, and other behavioral modes and patterns of movement are also possible.

III. Debris Sensor Structure and Operation

Figure 2:
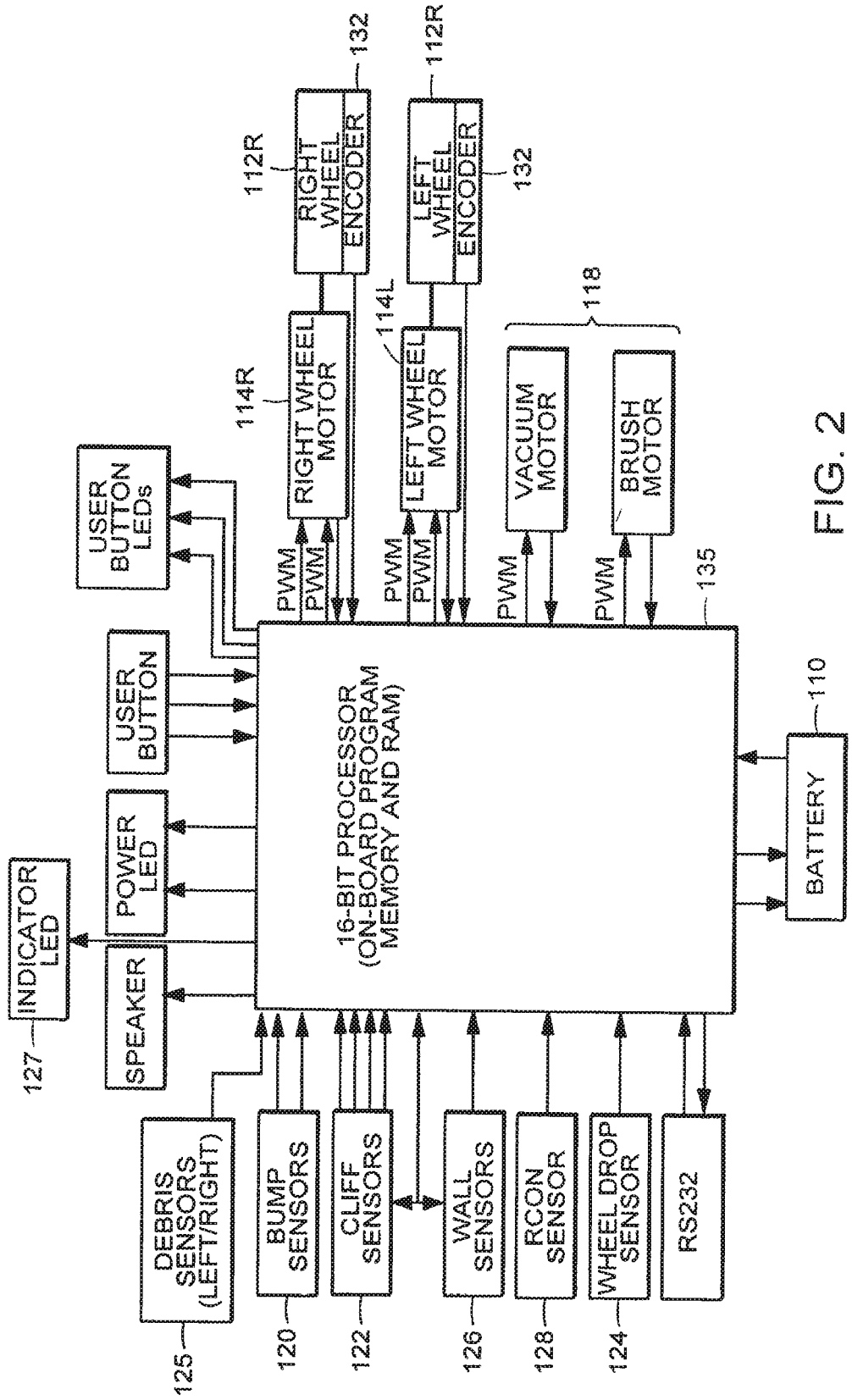
FIG. 2 is a block diagram of exemplary hardware elements of the robotic device of FIG. 1, including a debris sensor subsystem of the invention.
Figure 7:
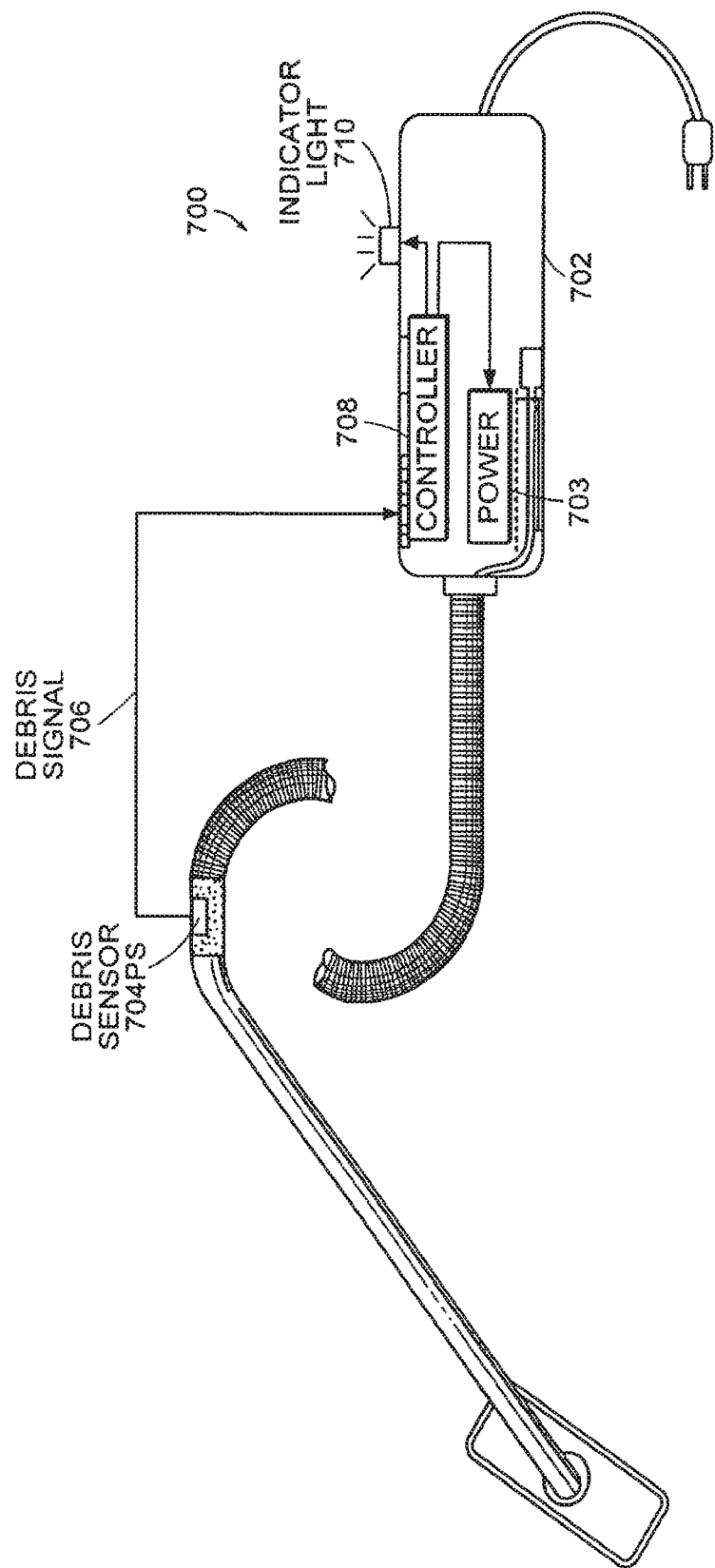
FIG. 7 is a schematic diagram showing the debris sensor in a non-autonomous cleaning apparatus.

As shown in FIGS. 1-3, in accordance with the present invention, an autonomous cleaning device (and similarly, a non-autonomous cleaning device as shown by way of example in FIG. 7) can be improved by incorporation of a debris sensor. In the embodiment illustrated in FIGS. 1 and 3, the debris sensor subsystem comprises left and right piezoelectric sensing elements 125L, 125R situated proximate to or within a cleaning pathway of a cleaning device, and electronics for processing the debris signal from the sensor for forwarding to a microprocessor 135 or other controller.

When employed in an autonomous, robot cleaning device, the debris signal from the debris sensor can be used to select a behavioral mode (such as entering into a spot cleaning mode), change an operational condition (such as speed, power or other), steer in the direction of debris (particularly when spaced-apart left and right debris sensors are used to create a differential signal), or take other actions.

A debris sensor according to the present invention can also be incorporated into a non-autonomous cleaning device. When employed in a non-autonomous cleaning device such as, for example, an otherwise relatively conventional vacuum cleaner 700 like that shown in FIG. 7, the debris signal 706 generated by a piezoelectric debris sensor 704PS situated within a cleaning or vacuum pathway of the device can be employed by a controlling microprocessor 708 in the body of the vacuum cleaner 702 to generate a user-perceptible signal (such as by lighting a light 710), to increase power from the power system 703, or take some combination of actions (such as lighting a "high power" light and simultaneously increasing power).

The algorithmic aspects of the operation of the debris sensor subsystem are summarized in FIG. 8. As shown therein, a method according to the invention can include detecting left and right debris signals representative of debris strikes, and thus, of the presence, quantity or volume, and direction of debris (802); selecting an operational mode or pattern of movement (such as Spot Coverage) based on the debris signal values (804); selecting a direction of movement based on differential left/right debris signals (e.g., steering toward the side with more debris) (806); generating a user-perceptible signal representative of the presence of debris or other characteristic (e.g., by illuminating a user-perceptible LED) (808); or otherwise varying or controlling an operational condition, such as power (810).

A further practice of the invention takes advantage of the motion of an autonomous cleaning device across a floor or other surface, processing the debris signal in conjunction with knowledge of the cleaning device's movement to calculate a debris gradient (812 in FIG. 8). The debris gradient is representative of changes in debris strikes count as the autonomous cleaning apparatus moves along a surface. By examining the sign of the gradient (positive or negative, associated with increasing or decreasing debris), an autonomous cleaning device controller can continuously adjust the path or pattern of movement of the device to clean a debris field most effectively (812).

Figure 4:
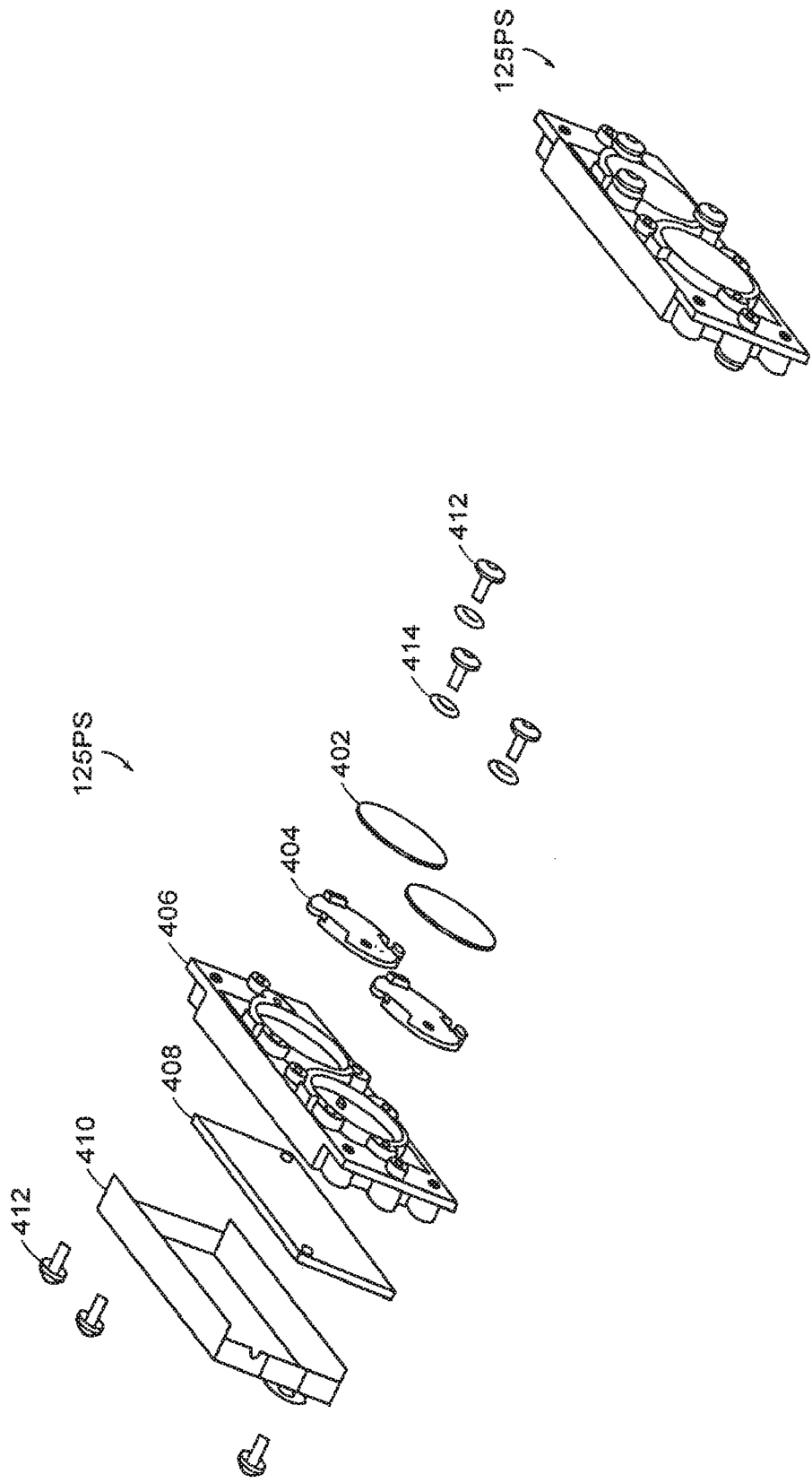
FIG. 4 is an exploded diagram of a piezoelectric debris sensor in accordance with the invention.

Piezoelectric Sensor: As noted above, a piezoelectric transducer element can be used in the debris sensor subsystem of the invention. Piezoelectric sensors provide instantaneous response to debris strikes and are relatively immune to accretion that would An example of a piezoelectric transducer 125PS is shown in FIG. 4. Referring now to FIG. 4, the piezoelectric sensor element 125PS can include one or more 0.20 millimeter thick, 20 millimeter diameter brass disks 402 with the piezoelectric material and electrodes bonded to the topside (with a total thickness of 0.51 mm), mounted to an elastomer pad 404, a plastic dirt sensor cap 406, a debris sensor PC board with associated electronics 408, grounded metal shield 410, and retained by mounting screws (or bolts or the like) 412 and elastomer grommets 414. The elastomer grommets provide a degree of vibration dampening or isolation between the piezoelectric sensor element 125PS and the cleaning device.

In the example shown in FIG. 4, a rigid piezoelectric disk, of the type typically used as inexpensive sounders, can be used. However, flexible piezoelectric film can also be advantageously employed. Since the film can be produced in arbitrary shapes, its use affords the possibility of sensitivity to debris across the entire cleaning width of the cleaning device, rather than sensitivity in selected areas where, for example, the disks may be located. Conversely, however, film is at present substantially more expensive and is subject to degradation over time. In contrast, brass disks have proven to be extremely robust.

The exemplary mounting configuration shown in FIG. 4 is substantially optimized for use within a platform that is mechanically quite noisy, such as an autonomous vacuum cleaner like that shown in FIG. 3. In such a device, vibration dampening or isolation of the sensor is extremely useful. However, in an application involving a non-autonomous cleaning device such as a canister-type vacuum cleaner like that shown in FIG. 7, the dampening aspects of the mounting system of FIG. 4 may not be necessary. In a non-autonomous cleaning apparatus, an alternative mounting system may involve heat staking the piezoelectric element directly to its housing. In either case, a key consideration for achieving enhanced performance is the reduction of the surface area required to clamp, bolt, or otherwise maintain the piezoelectric element in place. The smaller the footprint of this clamped "dead zone", the more sensitive the piezoelectric element will be.

In operation, debris thrown up by the cleaning brush assembly (e.g., brush 94 of FIG. 3), or otherwise flowing through a cleaning pathway within the cleaning device (e.g., vacuum compartment 104 of FIG. 3) can strike the bottom, all-brass side of the sensor 125PS (see FIG. 3). In an autonomous cleaning device, as shown in FIG. 3, the debris sensor 125PS can be located substantially at an axis AX along which main brush 94 and flapper brush 92 meet, so that the particles 127 are thrown up and strike the sensor 125PS with maximum force.

As is well known, a piezoelectric sensor converts mechanical energy (e.g., the kinetic energy of a debris strike and vibration of the brass disk) into electrical energy—in this case, generating an electrical pulse each time it is struck by debris—and it is this electrical pulse that can be processed and transmitted to a system controller (e.g., controller 135 of FIGS. 1 and 2 or 708 of FIG. 8) to control or cause a change in operational mode, in accordance with the invention. Piezoelectric elements are typically designed for use as audio transducers, for example, to generate beep tones. When an AC voltage is applied, they vibrate mechanically in step with the AC waveform, and generate an audible output. Conversely, if they are mechanically vibrated, they produce an AC voltage output. This is the manner in which they are employed in the present invention. In particular, when an object first strikes the brass face of the sensor, it causes the disk to flex inward, which produces a voltage pulse.

Filtering: However, since the sensor element 125PS is in direct or indirect contact with the cleaning device chassis or body through its mounting system (see FIGS. 3 and 4), it is subject to the mechanical vibrations normally produced by motors, brushes, fans and other moving parts when the cleaning device is functioning. This mechanical vibration can cause the sensor to output an undesirable noise signal that can be larger in amplitude than the signal created by small, low mass debris (such as crushed black pepper) striking the sensor. The end result is that the sensor would output a composite signal composed of lower frequency noise components (up to approximately 16 kHz) and higher frequency, possibly lower amplitude, debris-strike components (greater than 30 kHz, up to hundreds of kHz). Thus, it is useful to provide a way to filter out extraneous signals.

Accordingly, as described below, an electronic filter is used to greatly attenuate the lower frequency signal components to improve signal-to-noise performance. Examples of the architecture and circuitry of such filtering and signal processing elements will next be described in connection with FIGS. 5 and 6.

IV. Signal Processing

Figure 5:
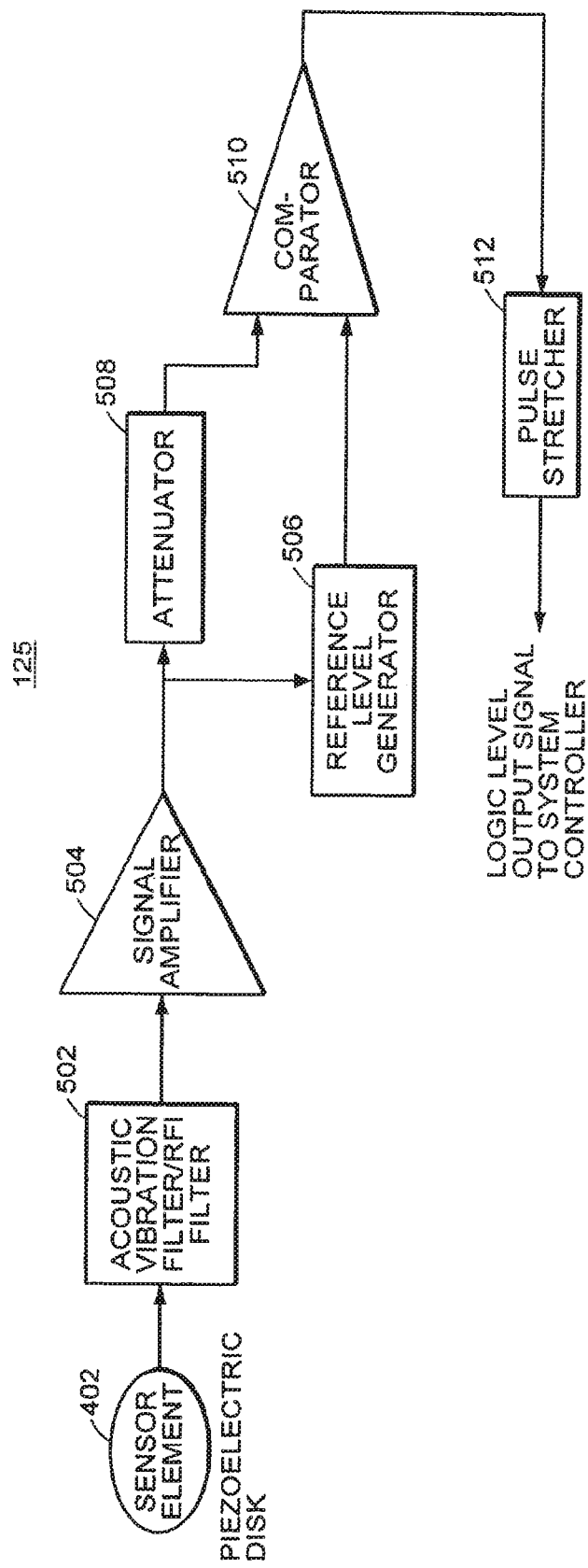
FIG. 5 is a schematic diagram of a debris sensor signal processing architecture according to the present invention.

FIG. 5 is a schematic diagram of the signal processing elements of a debris sensor subsystem in one practice of the invention.

As noted above, one purpose of a debris sensor is to enable an autonomous cleaning apparatus to sense when it is picking up debris or otherwise encountering a debris field. This information can be used as an input to effect a change in the cleaning behavior or cause the apparatus to enter a selected operational or behavioral mode, such as, for example, the spot cleaning mode described above when debris is encountered. In an non-autonomous cleaning apparatus like that shown in FIG. 7, the debris signal 706 from the debris sensor 704PS can be used to cause a user-perceptible light 710 to be illuminated (e.g., to signal to the user that debris is being encountered), to raise power output from the power until 703 to the cleaning systems, or to cause some other operational change or combination of changes (e.g., lighting a user-perceptible "high power" light and simultaneously raising power).

Moreover, as noted above, two debris sensor circuit modules (i.e., left and right channels like 125L and 125R of FIG. 1) can be used to enable an autonomous cleaning device to sense the difference between the amounts of debris picked up on the right and left sides of the cleaning head assembly. For example, if the robot encounters a field of dirt off to its left side, the left side debris sensor may indicate debris hits, while the right side sensor indicates no (or a low rate of debris hits. This differential output could be used by the microprocessor controller of an autonomous cleaning device (such as controller 135 of FIGS. 1 and 2) to steer the device in the direction of the debris (e.g., to steer left if the left-side debris sensor is generating higher signal values than the right-side debris sensor); to otherwise choose a vector in the direction of the debris; or to otherwise select a pattern of movement or behavior pattern such as spot coverage or other.

Thus, FIG. 5 illustrates one channel (for example, the left-side channel) of a debris sensor subsystem that can contain both left and right side channels. The right side channel is substantially identical, and its structure and operation will therefore be understood from the following discussion.

As shown in FIG. 5, the left channel consists of a sensor element (piezoelectric disk) 402, an acoustic vibration filter/RFI filter module 502, a signal amplifier 504, a reference level generator 506, an attenuator 508, a comparator 510 for comparing the outputs of the attenuator and reference level generator, and a pulse stretcher 512. The output of the pulse stretcher is a logic level output signal to a system controller like the processor 135 shown in FIG. 2; i.e., a controller suitable for use in selecting an operational behavior.

The Acoustic Vibration Filter/RFI Filter block 502 can be designed to provide significant attenuation (in one embodiment, better than −45 dB Volts), and to block most of the lower frequency, slow rate of change mechanical vibration signals, while permitting higher frequency, fast rate of change debris-strike signals to pass. However, even though these higher frequency signals get through the filter, they are attenuated, and thus require amplification by the Signal Amplifier block 504.

In addition to amplifying the desired higher frequency debris strike signals, the very small residual mechanical noise signals that do pass through the filter also get amplified, along with electrical noise generated by the amplifier itself, and any radio frequency interference (RFI) components generated by the motors and radiated through the air, or picked up by the sensor and its conducting wires. The signal amplifier's high frequency response is designed to minimize the amplification of very high frequency RFI. This constant background noise signal, which has much lower frequency components than the desired debris strike signals, is fed into the Reference Level Generator block 506. The purpose of module 506 is to create a reference signal that follows the instantaneous peak value, or envelope, of the noise signal. It can be seen in FIG. 5 that the signal of interest, i.e., the signal that results when debris strikes the sensor, is also fed into this block. Thus, the Reference Level Generator block circuitry is designed so that it does not respond quickly enough to high frequency, fast rate of change debris-strike signals to be able to track the instantaneous peak value of these signals. The resulting reference signal will be used to make a comparison as described below.

Referring again to FIG. 5, it will be seen that the signal from amplifier 504 is also fed into the Attenuator block. This is the same signal that goes to the Reference Level Generator 506, so it is a composite signal containing both the high frequency signal of interest (i.e., when debris strikes the sensor) and the lower frequency noise. The Attenuator 508 reduces the amplitude of this signal so that it normally is below the amplitude of the signal from the Reference Level Generator 506 when no debris is striking the sensor element.

The Comparator 510 compares the instantaneous voltage amplitude value of the signal from the Attenuator 508 to the signal from the Reference Level Generator 506. Normally, when the cleaning device operating is running and debris are not striking the sensor element, the instantaneous voltage coming out of the Reference Level Generator 506 will be higher than the voltage coming out of the Attenuator block 508. This causes the Comparator block 510 to output a high logic level signal (logic one), which is then inverted by the Pulse Stretcher block 512 to create a low logic level (logic zero).

However, when debris strikes the sensor, the voltage from the Attenuator 508 exceeds the voltage from the Reference Level Generator 506 (since this circuit cannot track the high frequency, fast rate of change signal component from the Amplifier 504) and the signal produced by a debris strike is higher in voltage amplitude than the constant background mechanical noise signal which is more severely attenuated by the Acoustic Vibration Filter 502. This causes the comparator to momentarily change state to a logic level zero. The Pulse Stretcher block 512 extends this very brief (typically under 10-microsecond) event to a constant 1 millisecond (+0.3 mS, −0 mS) event, so as to provide the system controller (e.g., controller 135 of FIG. 2) sufficient time to sample the signal.

When the system controller "sees" this 1-millisecond logic zero pulse, it interprets the event as a debris strike.

Referring now to the RFI Filter portion of the Acoustic Vibration Filter/RFI Filter block 502, this filter serves to attenuate the very high frequency radiated electrical noise (RFD), which is generated by the motors and motor driver circuits.

In summary, the illustrated circuitry connected to the sensor element uses both amplitude and frequency information to discriminate a debris strike (representative of the cleaning device picking up debris) from the normal background mechanical noise also picked up by the sensor element and the radiated radio frequency electrical noise produced by the motors and motor driver circuits. The normal, though undesirable, constant background noise is used to establish a dynamic reference that prevents false debris-strike indications while maintaining a good signal-to-noise ratio.

In practice, the mechanical mounting system for the sensor element (see FIG. 4) is also designed to help minimize the mechanical acoustic noise vibration coupling that affects the sensor element.

Figure 6A:
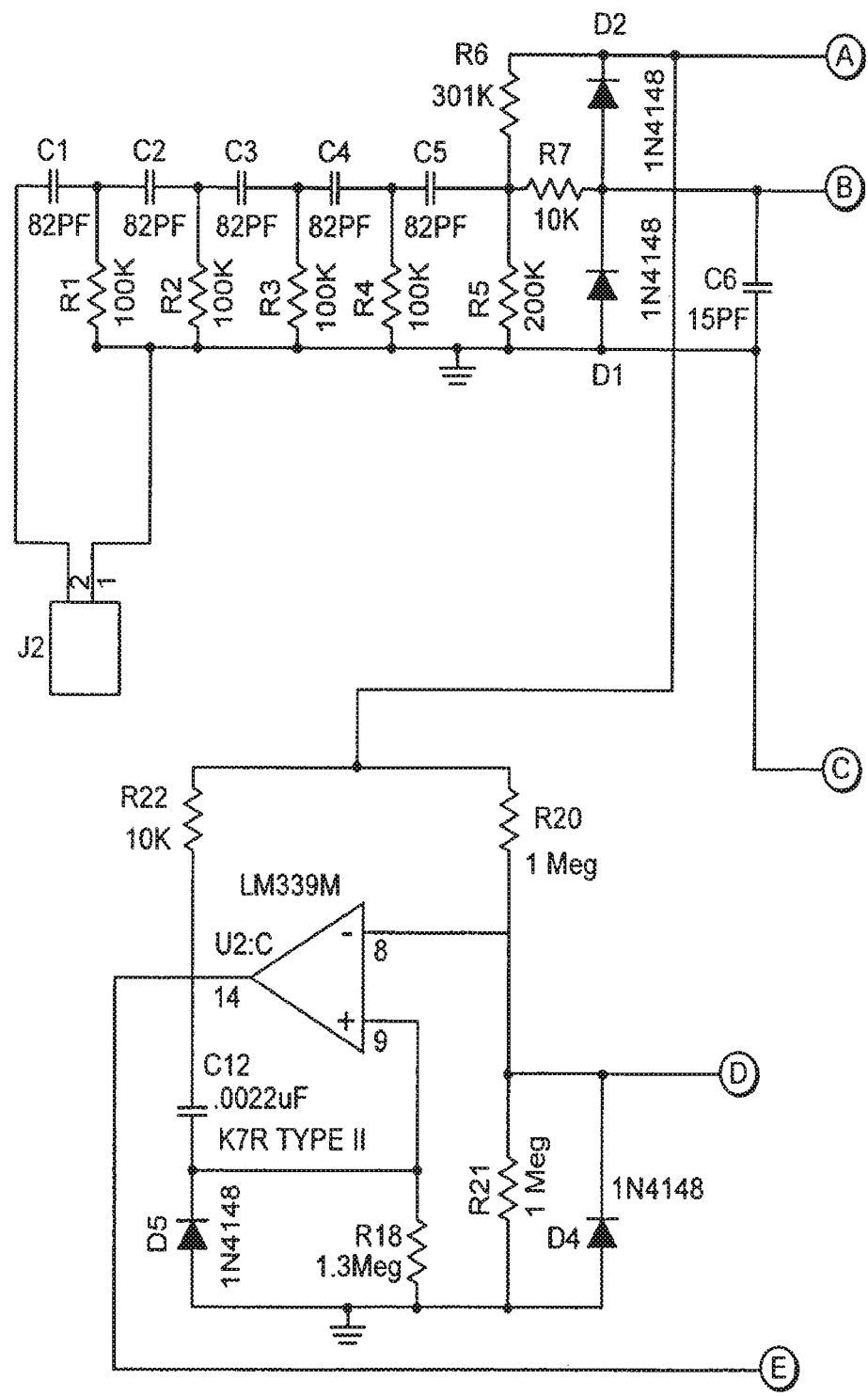
FIG. 6A is a schematic diagram of a first portion of the signal processing circuitry.
Figure 6B:
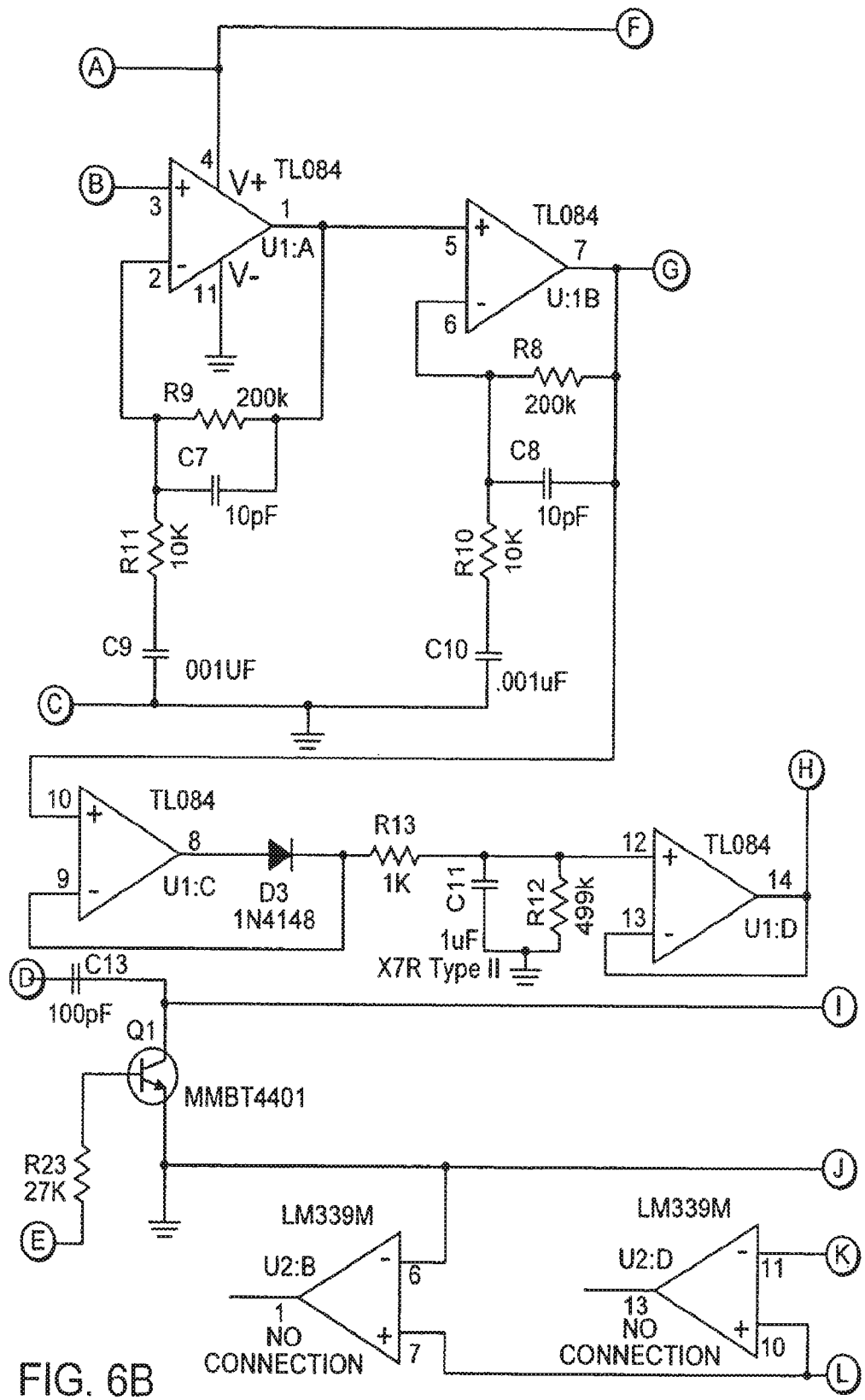
FIG. 6B is a schematic diagram of a second portion of the signal processing circuitry.
Figure 6C:
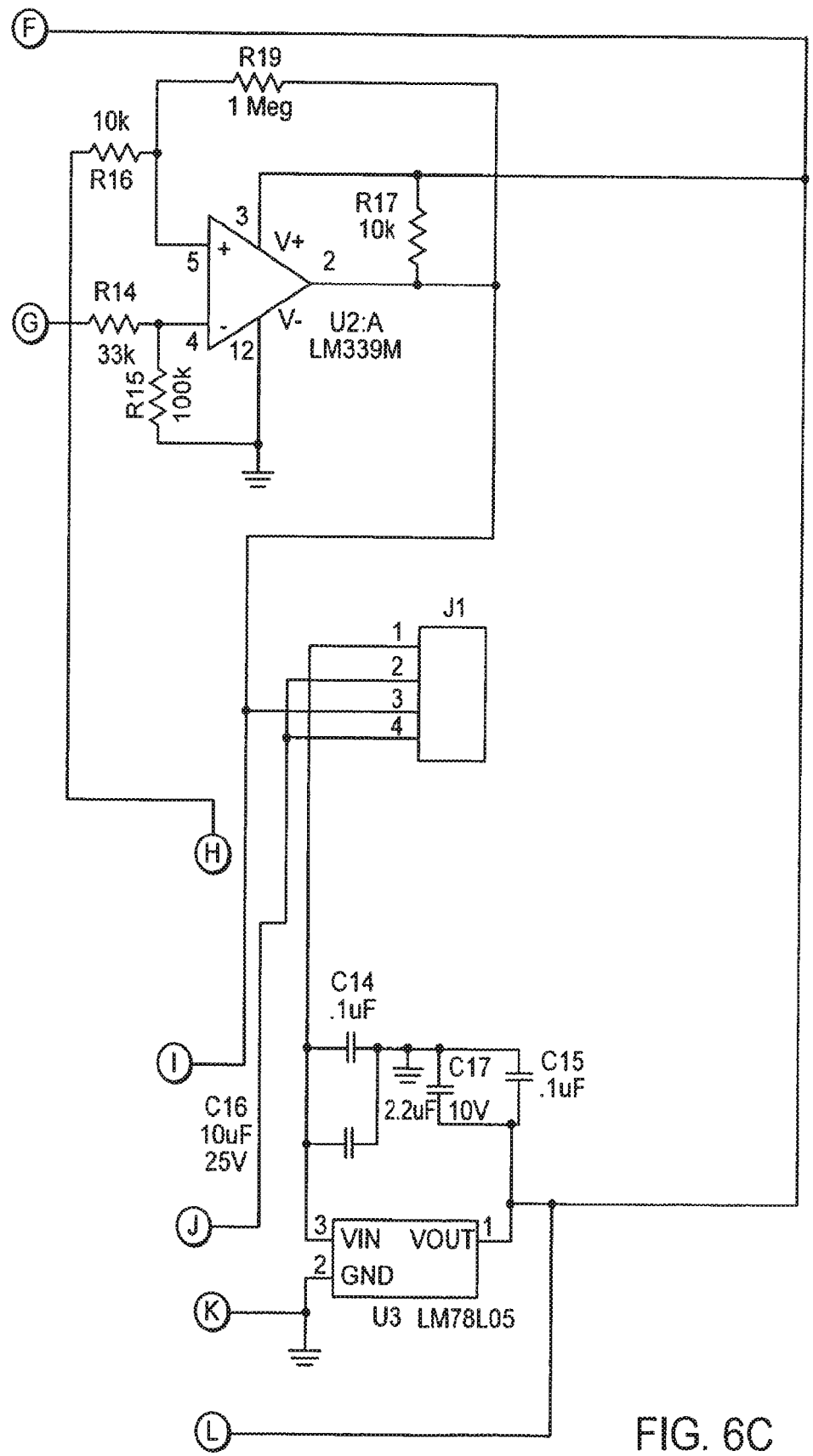
FIG. 6C is a schematic diagram of a third portion of the signal processing circuitry.

Signal Processing Circuitry: FIG. 6 is a detailed schematic diagram of exemplary debris sensor circuitry. FIGS. 6A to 6C are detailed schematic diagrams of first, second, and third portions, respectively, of the exemplary debris sensor circuitry. Those skilled in the art will understand that in other embodiments, the signal processing can be partially or entirely contained and executed within the software of the microcontroller 135. With reference to FIGS. 6 and 6A to 6C, the illustrated example of suitable signal processing circuitry contains the following elements, operating in accordance with the following description:

The ground referenced, composite signal from the piezoelectric sensor disk (see piezoelectric disk 402 of FIG. 4) is fed into the capacitor C1, which is the input to the 5-pole, high pass, passive R-C filter designed to attenuate the low frequency, acoustic mechanical vibrations conducted into the sensor through the mounting system. This filter has a 21.5 kHz, −3 dB corner frequency rolling off at −100 dB/Decade. The output of this filter is fed to a signal pole, low pass, passive R-C filter designed to attenuate any very high frequency RFI. This filter has a 1.06 MHz, 31 3 dB corner frequency rolling off at −20 dB/Decade. The output of this filter is diode clamped by D1 and D2 in order to protect U1 from high voltage transients in the event the sensor element sustains a severe strike that generates a voltage pulse greater than the amplifier's supply rails. The DC biasing required for signal-supply operation for the amplifier chain and subsequent comparator circuitry is created by R5 and R6. These two resistor values are selected such that their thevenin impedance works with C5 to maintain the filter's fifth pole frequency response correctly.

U1A, U1B and their associated components form a two stage, ac-coupled, non-inverting amplifier with a theoretical AC gain of 441. C9 and C10 serve to minimize gain at low frequencies while C7 and C8 work to roll the gain off at RFI frequencies. The net theoretical frequency response from the filter input to the amplifier output is a single pole high pass response with −3 dB at 32.5 kHz, −100 dB/Decade, and a 2-pole low pass response with break frequencies at 100 kHz, −32 dB/Decade, and 5.4 MHz, −100 dB/Decade, together forming a band-pass filter.

The output from the amplifier is split, with one output going into R14, and the other to the non-inverting input of U1C. The signal going into R14 is attenuated by the R14-R15 voltage divider, and then fed into the inverting input of comparator U2A. The other signal branch from the output of U1B is fed into the non-inverting input of amplifier U1C. UIC along with U1D and the components therebetween (as shown in FIG. 2) form a half-wave, positive peak detector. The attack and decay times are set by R13 and R12, respectively. The output from this circuit is fed to the non-inverting input of U2A through R16. R16 along with R19 provide hysteresis to improve switching time and noise immunity. U2A functions to compare the instantaneous value between the output of the peak detector to the output of the R14-R15 attenuator.

Normally, when debris is not striking the sensor, the output of the peak detector will be greater in amplitude than the output of the attenuator network. When debris strikes the sensor, a high frequency pulse is created that has a higher amplitude coming out of the front-end high pass filter going into U1A than the lower frequency mechanical noise signal component. This signal will be larger in amplitude, even after coming out of the R14-R15 attenuator network, than the signal coming out of the peak detector, because the peak detector cannot track high-speed pulses due to the component values in the R13, C11, R12 network. The comparator then changes state from high to low for as long as the amplitude of the debris-strike pulse stays above the dynamic, noise generated, reference-level signal coming out of the peak detector. Since this comparator output pulse can be too short for the system controller to see, a pulse stretcher is used.

The pulse stretcher is a one-shot monostable design with a lockout mechanism to prevent re-triggering until the end of the timeout period. The output from U2A is fed into the junction of C13 and Q1. C13 couples the signal into the monostable formed by U2C and its associated components. Q1 functions as the lockout by holding the output of U2A low until the monostable times out. The timeout period is set by the time constant formed by R22, C12 and R18, and the reference level set by the R20-R21 voltage divider. This time can adjusted for 1 mS, +0.3 mS, −0.00 mS as dictated by the requirements of the software used by the controller/processor.

Power for the debris sensor circuit is provided by U3 and associated components. U3 is a low power linear regulator that provides a 5-volt output. The unregulated voltage from the robot's onboard battery provides the power input.

When required, circuit adjustments can be set by R14 and R12. These adjustments will allow the circuit response to be tuned in a short period of time In a production device of this kind, it is expected that power into, and signal out of the debris sensor circuit printed circuit board (PCB) will be transferred to the main board via shielded cable. Alternatively, noise filters may be substituted for the use of shielded cable, reducing the cost of wiring. The cable shield drain wire can be grounded at the sensor circuit PCB side only. The shield is not to carry any ground current. A separate conductor inside the cable will carry power ground. To reduce noise, the production sensor PCB should have all components on the topside with solid ground plane on the bottom side. The sensor PCB should be housed in a mounting assembly that has a grounded metal shield that covers the topside of the board to shield the components from radiated noise pick up from the robot's motors. The piezoelectric sensor disk can be mounted under the sensor circuit PCB on a suitable mechanical mounting system, such as that shown in FIG. 4, in order to keep the connecting leads as short as possible for noise immunity.

V. Conclusions

The invention provides a debris sensor that is not subject to degradation by accretion of debris, but is capable of instantaneously sensing and responding to debris strikes, and thus immediately responsive to debris on a floor or other surface to be cleaned, with reduced sensitivity to variations in airflow, instantaneous power, or other operational conditions of the cleaning device.

When employed as described herein, the invention enables an autonomous cleaning device to control its operation or select from among operational modes, patterns of movement or behaviors responsive to detected debris, for example, by steering the device toward "dirtier" areas based on signals generated by the debris sensor.

The debris sensor can also be employed in non-autonomous cleaning devices to control, select or vary operational modes of either an autonomous or non-autonomous cleaning apparatus.

In addition, the disclosed signal processing architecture and circuitry is particularly useful in conjunction with a piezoelectric debris sensor to provide high signal to noise ratios.

Those skilled in the art will appreciate that a wide range of modifications and variations of the present invention are possible and within the scope of the invention. The debris sensor can also be employed for purposes, and in devices, other than those described herein. Accordingly, the foregoing is presented solely by way of example, and the scope of the invention is limited solely by the appended claims.

We claim:

1. An autonomous cleaning apparatus comprising:
 a vacuum assembly;
 a cleaning head positioned forward of an inlet of the vacuum assembly, the cleaning head comprising a cleaning element configured to sweep up debris from a cleaning surface;
 a piezoelectric sensor disposed above the cleaning element, the piezoelectric sensor being configured to detect the debris swept up by the cleaning element or pulled by the vacuum assembly;
 a drive system configured to move the autonomous cleaning apparatus; and
 a control module coupled to the piezoelectric sensor, the control module being configured to
  select an operational mode based on signal values from the piezoelectric sensor, and
  control the drive system to control movement of the autonomous cleaning apparatus in accordance with the operational mode.

2. The autonomous cleaning apparatus of claim 1, further comprising a side brush configured to direct debris from outside a periphery of the autonomous cleaning apparatus toward the cleaning head.

3. The autonomous cleaning apparatus of claim 2, wherein:
 a fore-aft axis divides the autonomous cleaning apparatus into a right half comprising a right wheel of the drive system and a left half comprising a left wheel of the drive system, and
 the side brush is disposed on a forward portion of the right half or the left half of the autonomous cleaning apparatus.

4. The autonomous cleaning apparatus of claim 3, further comprising a dominant half corresponding to the right half or the left half, wherein an obstacle-following unit and the side brush are each disposed on the dominant half of the autonomous cleaning apparatus.

5. The autonomous cleaning apparatus of claim 3, wherein the cleaning element is on the right half and the left half of the autonomous cleaning apparatus and rearward of the side brush.

6. The autonomous cleaning apparatus of claim 1, further comprising a debris bin that is removable and that is disposed rearward of the cleaning head.

7. The autonomous cleaning apparatus of claim 6, wherein the cleaning element comprises a rotating flapper element configured to direct debris toward the debris bin.

8. The autonomous cleaning apparatus of claim 1, wherein the piezoelectric sensor is located above the cleaning element.

9. The autonomous cleaning apparatus of claim 8, wherein the piezoelectric sensor is located on a roof of the cleaning head.

10. The autonomous cleaning apparatus of claim 1, wherein the signal values are representative of a debris impact.

11. The autonomous cleaning apparatus of claim 1, wherein the signal values are representative of a quantity of the debris detected by the piezoelectric sensor.

12. The autonomous cleaning apparatus of claim 1, wherein the control module is configured to control the drive system to control movement of the autonomous cleaning apparatus by navigating the autonomous cleaning apparatus in a spiral pattern in accordance with the operational mode.

13. The autonomous cleaning apparatus of claim 1, wherein the control module is configured to control the drive system to control movement of the autonomous cleaning apparatus by changing a speed of the autonomous cleaning apparatus in accordance with the operational mode.

14. The autonomous cleaning apparatus of claim 13, wherein the control module is configured to change the speed of autonomous cleaning apparatus by slowing the autonomous cleaning apparatus.

15. An autonomous cleaning apparatus comprising:
a drive system comprising a right wheel assembly and a left wheel assembly;
a side brush;
a cleaning head comprising a rotating cleaning element;
a control module configured to control the drive system;
a debris bin; and
a debris sensor disposed between the cleaning head and the debris bin,
wherein the side brush is configured to direct debris from a cleaning surface toward the cleaning head,
wherein the cleaning head is configured to direct the debris toward the debris bin,
wherein the debris sensor is configured to detect the debris directed toward the debris bin, and
wherein the control module is configured to
select an operational mode based at least in part on a signal representative of the debris detected by the debris sensor, and
control the drive system to control movement of the autonomous cleaning apparatus in accordance with the operational mode.

16. The autonomous cleaning apparatus of claim 15, wherein a rotational rate of one or both of the right and left wheel assemblies is changeable based at least in part on the signal representative of the debris detected by the debris sensor.

17. The autonomous cleaning apparatus of claim 16, wherein the rotational rate of one or both of the right and left wheel assemblies is reduced in response to the signal representative of the debris detected by the debris sensor.

18. The autonomous cleaning apparatus of claim 15, wherein the drive system is configured to navigate the autonomous cleaning apparatus in a spiral pattern in accordance with the operational mode.

19. The autonomous cleaning apparatus of claim 15, wherein the signal representative of the debris is representative of a quantity of the debris.

* * * * *